(12) United States Patent
Amacker (10) Patent No.: US 8,793,333 B1
(45) Date of Patent: Jul. 29, 2014

(54) MATRIX VIEWING

(75) Inventor: Matthew Amacker, Palo Alto, CA (US)

(73) Assignee: A9.com, Inc., Reno, NV (US)

( * ) Notice: Subject to any disclaimer, the term of this patent is extended or adjusted under 35 U.S.C. 154(b) by 729 days.

(21) Appl. No.: 12/731,707

(22) Filed: Mar. 25, 2010

(51) Int. Cl.
*G06F 15/16* (2006.01)

(52) U.S. Cl.
USPC ............................. 709/217; 715/784; 345/684

(58) Field of Classification Search
None
See application file for complete search history.

(56) References Cited

U.S. PATENT DOCUMENTS

| | | | |
|---|---|---|---|
| 8,001,487 B2 * | 8/2011 | Koppert ........................ | 715/830 |
| 2008/0068340 A1 * | 3/2008 | Landschaft et al. .......... | 345/169 |
| 2008/0086688 A1 * | 4/2008 | Chandratillake et al. ..... | 715/719 |
| 2008/0235205 A1 * | 9/2008 | Fein et al. ........................ | 707/5 |
| 2009/0019383 A1 * | 1/2009 | Riley et al. .................... | 715/764 |
| 2009/0093275 A1 * | 4/2009 | Oh et al. ........................ | 455/566 |
| 2009/0187558 A1 * | 7/2009 | McDonald ........................ | 707/5 |
| 2009/0271369 A1 * | 10/2009 | Cheng et al. .................... | 707/3 |
| 2009/0287655 A1 * | 11/2009 | Bennett ............................ | 707/3 |
| 2010/0076960 A1 * | 3/2010 | Sarkissian et al. ............ | 707/722 |
| 2010/0333204 A1 * | 12/2010 | Shpits ............................ | 726/24 |

OTHER PUBLICATIONS

Author Unknown "News Ticker—Wikipedia, the free encyclopedia" published at http://en.wikipedia.org/wiki/News_ticker (Publication date unknown) (As viewed Nov. 23, 2010).

* cited by examiner

*Primary Examiner* — Ario Etienne
*Assistant Examiner* — Clayton R Williams
(74) *Attorney, Agent, or Firm* — Thomas | Horstemeyer, LLP (57) ABSTRACT

Disclosed are various embodiments of systems, methods and computer readable mediums for matrix viewing. In one embodiment, among others, a system comprises at least one computing device and an application executable in the at least one computing device. The application comprises logic that searches and gathers a plurality of item representations based at least in part on a search query retrieved from a client computing device. The application further comprises logic that encodes a network page for rendering by the client computing device. The network page provides a matrix view of at least a portion of the item representations. Also, the matrix view includes a plurality of streams. At least one of the streams comprises a moving progression of the item representations across at least a portion of the network page.

27 Claims, 10 Drawing Sheets

MATRIX VIEWING

BACKGROUND

Search results are often presented as a list on a webpage rendered using a browser on a computer. Typically only a portion of the search results are initially displayed in the webpage. Thus, a user may have to scroll down the page to view a remaining portion of the search results. Also, the user might have to click on links to other webpages just to see additional portions of the list, if the list is long.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

In the following discussion, various embodiments of systems, methods and other embodiments for viewing items in a matrix view are described. A matrix view includes two or more "streams" of item representations in a network page rendered by a browser on a computer. A stream is a moving or animated progression of item representations across at least a portion of the network page. For example, a matrix view may include several columns and/or rows containing of a variety of item images moving across a page. The item images may correspond to the results of a search input into a computer by a user. Matrix viewing may allow a user to more efficiently view or evaluate the search results.

Figure 1:
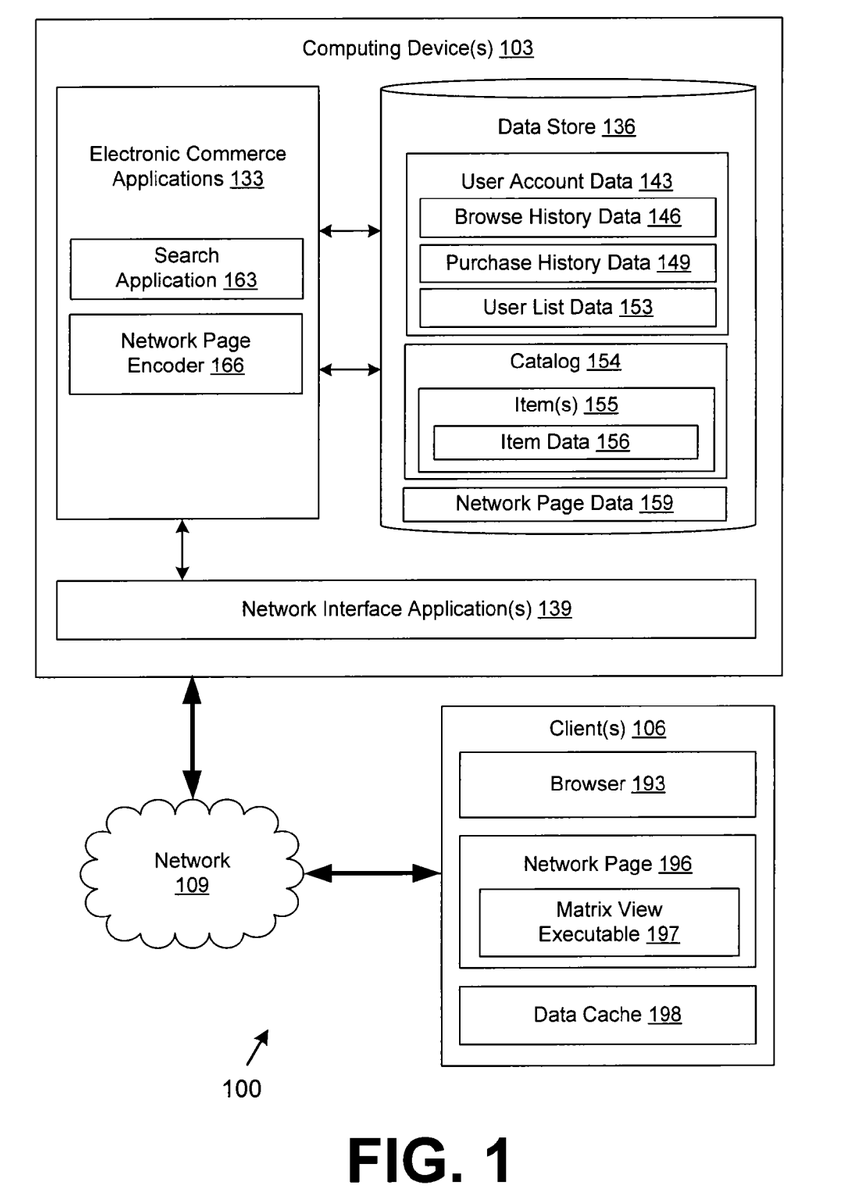
FIG. 1 is a drawing of a data communications network according to various embodiments of the present disclosure.

With reference to FIG. 1, shown is a data communications network 100 according to various embodiments. The data communications network 100 includes a computing device 103 and a client 106 in communication over a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. A plurality of computing devices 103 together may comprise, for example, a cloud computing resource, a grid computing resource, and/or any other distributed computing arrangement. Such computing devices 103 may be located in a single installation or may be dispersed among many different geographical locations. In one embodiment, the computing device 103 represents a virtualized computer system executing on one or more physical computing systems. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 136 that is accessible to the computing device 103. The data store 136 may be representative of a plurality of data stores as can be appreciated. The data stored in the data store 136, for example, is associated with the operation of the various applications and/or functional entities described below.

The components executed on the computing device 103, for example, include electronic commerce application(s) 133, network interface application(s) 139, and other applications, services, processes, systems, engines, or functionality not discussed in detail herein. The electronic commerce application 133 is executed in order to facilitate the online purchase of items over the network 109. The electronic commerce application 133 also performs various backend functions associated with the online presence of a merchant in order to facilitate the online purchase of items as will be described. For example, the electronic commerce application 133 generates one or more network pages 196, using a network page encoder 166, such as web pages or other types of network content that are provided to client(s) 106 for the purposes of selecting items for purchase, rental, download, lease, or other form of consumption as will be described.

A network page 196 may include code that generates dynamic network pages when executed or interpreted in the client 106. Such code may be written in any suitable programming language, such as PHP, Perl, Objective C, Java, Ruby, etc. Also, the network pages 196 may also include code configured to be executed or interpreted within the client 106 in order to render a dynamic network page. Such code may be referred to as an executable and may be written in any suitable programming language, such as Java Script, Java, etc. For example, the network page 196 in the embodiment illustrated in FIG. 1 includes a matrix view executable 197.

A network page 196 may also include network page data 159 that is data relating to network pages 196 served up by the electronic commerce application 133. To this end, network page data 159 may include static network pages 196 or static elements of network pages 196, for example, in hypertext markup language (HTML), extensible markup language (XML), and/or any other language suitable for creating network pages 196.

The network page data 159 is stored in the data store 136. Additionally, the data store 136 stores, for example, user account data 143, a catalog 154, and potentially other data as well as the network page data 159. The user account data 143 includes browse history data 146, purchase history data 149, user list data 153, and potentially other user data. The user list data 153 may include data relating to lists of items associated with users. Such users may be registered users with a formal account or may merely be visitors. Such lists of items in user list data 153 may include shopping cart lists used in placing orders, gift lists, wish lists, and/or any other lists for users to track one or more items.

The catalog 154 may include items 155 and item data 156 related to the items 155. The item data 156 may include, for example, item titles, item images, item representations, item descriptions, item prices, item quantities, item review, item categories, item manufacturer, item technical information, item sizes, item colors, item options, item dimensions, and/or other data that may be used to describe or otherwise relate to items 155. In some embodiments, each item datum 156 corresponds to an item 155. However, in some embodiments, an item datum 156 may correspond to more than one item 155. For example, an item image or an item representation may depict more than one item 155.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability.

The client 106 may be configured to execute various applications such as a browser 193 and/or other applications. The browser 193 may be executed in a client 106, for example, to access and render network pages 196, such as web pages, or other network content served up by the computing device 103 and/or other servers. The network pages 196, as mentioned above, include a matrix view executable 197 obtained from the electronic commerce application(s) 133, which may comprise client-side code to be interpreted or executed within the browser 193 on the client 106 in order to render a matrix view. The matrix view executable 197 may include dynamic HTML (DHTML), Flash, VB Script, Java Script, Java, Ajax, ActiveX, and/or any other client-side code.

The client 106 also includes a data cache 198 to store data obtained from the electronic commerce application 133 and/or other sources. The data stored within the data cache 198 may speed rendering or re-rendering of network pages 196 by the browser 193 so that it may not be necessary to re-obtain data that has already been downloaded to the client 106. Also, the client 106 may be configured to execute applications beyond the browser 193 such as, for example, email applications, instant message applications, and/or other applications.

Next, a general description of the operation of the various components of the data communications network 100 is provided. To begin, a user, at a client 106, accesses a network page 196 using a browser 193 on a network site from the electronic commerce application 133 over the network 109. Through this initial access, or through a subsequent access, the client 106 may provide a search query regarding one or more items to the electronic commerce application 133. Such search query may comprise keywords, an item category, and/or any other type of item query.

In response to the search query, the search application 163 of the electronic commerce application 133 in the computing device 103 generates a collection of items 155 (e.g., search results) as a result of a search based at least in part on the search query. After the collection of items 155 is generated, the network page encoder 166 of the electronic commerce application 133 encodes one or more network pages for rendering in the browser 193 executing on a client 106. As will be discussed in further detail below, these network pages are encoded to provide a matrix view of at least a portion of the collection of items 155.

The network page(s) are then sent from the electronic commerce application 133 to the client 106 over the network 109. In some embodiments, the browser 193 may request that the matrix view in the network page be updated based at least in part on a user input.

Figure 2:
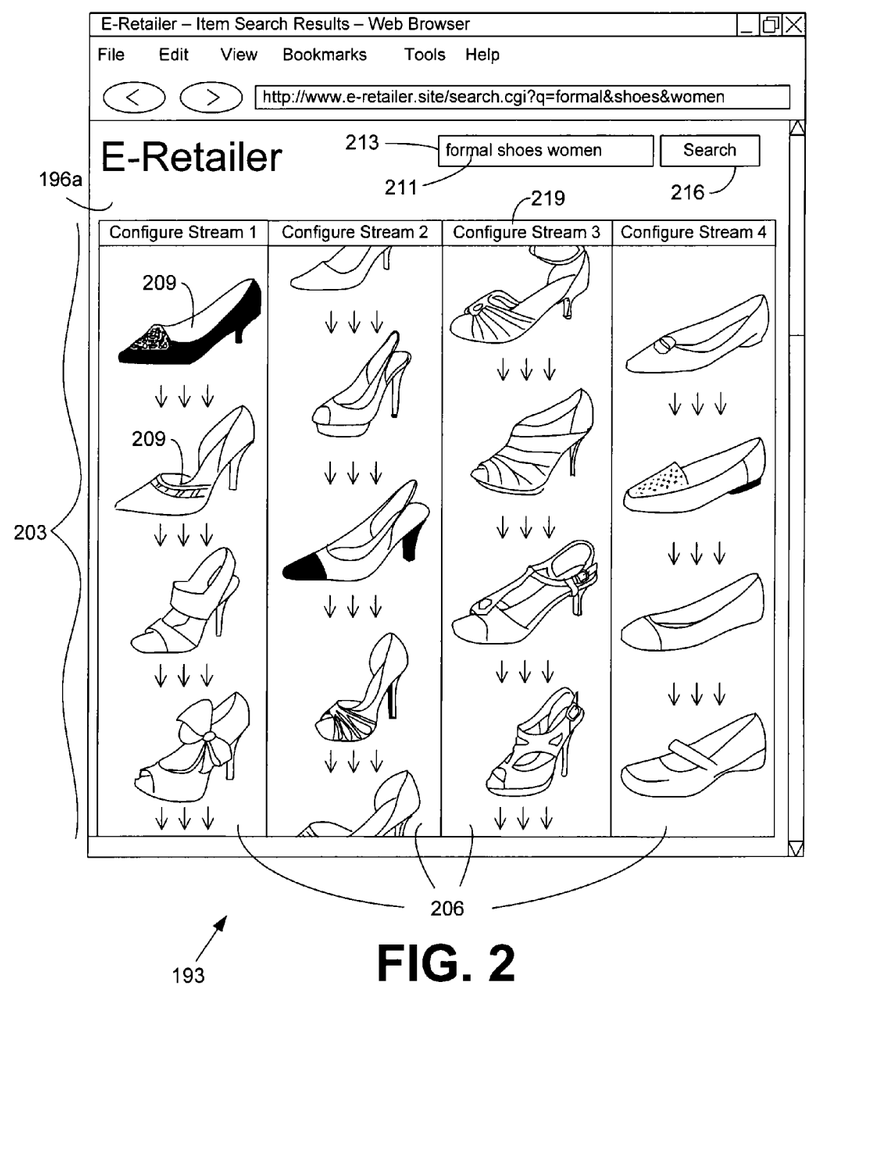
FIGS. 2, 3, 4, 5, 6A, and 6B are drawings of examples of network pages rendered by a client in the data communications network of FIG. 1 according to various embodiments of the present disclosure.

Turning now to FIG. 2, shown is a drawing of an example of a network page 196 (FIG. 1), denoted herein as 196*a*, that is rendered by a client 106 (FIG. 1) in the data communications network 100 (FIG. 1) according to various embodiments of the present disclosure. In particular, FIG. 2 includes an example of a matrix view 203 in a network page 196*a* rendered by the browser 193 (FIG. 1). The matrix view 203 illustrated in FIG. 2 includes two or more streams 206 of item data 156 (FIG. 1), which in the example illustrated in FIG. 2, includes item representations 209.

A stream 206 is a moving progression of item representations 209 across at least a portion of a network page 196*a*. The stream 206 may be vertical, horizontal, diagonal, circular, and/or another orientation across at least a portion of a network page 196*a*. In the example illustrated in FIG. 2, the stream 206 is a vertical column. In some embodiments, the moving progression includes item data 156 in addition to, or instead of, item representations 209. The item representations 209 correspond to at least a portion of a collection of items 155. For example, each of the item representations 209 illustrated in FIG. 2 corresponds to a respective one of the items 155 in the portion of the collection of items 155. In some embodiments, a stream 206 is a moving progression of item representations 209 corresponding to a user list data 153 (FIG. 1).

In some embodiments, the moving progression of a stream 206 is repeated, while in other embodiments, the moving progression occurs once responsive to a rendering of the network page 196*a*. In some embodiments, a button may be provided in the network page 196*a* that allows a user to toggle between a cyclical progression or a progression that includes one iteration.

The matrix view 203 enables a user to observe a greater amount of item representations 209 than when observing a statically displayed list of items 155. Because the item representations 209 are moving within a stream 206, a user does not have to scroll down in the network page 196*a* or click any links to view remaining portions of a list of items 155 on another network page 196.

The matrix view 203 may be rendered responsive to a search query 211 (e.g., "formal shoes women") provided in a search field 213 by a user. The network page 196*a* may also include a search button 216 to facilitate submission of a search query 211 in the search field 213. Accordingly, instead of presenting a list of search results, the search results are provided in the form of a matrix view 203 including streams 206 that are moving progressions of item representations 209 across a network page 196*a*, as illustrated in FIG. 2.

In some embodiments, a matrix view button may be provided that allows a user to toggle between a list of at least a portion of a collection of items 155 and a matrix view 203 of at least a portion of a collection of items 155. In some embodiments, whether the matrix view 203 is rendered may depend at least in part on the items 155 to be searched. For example, whether the matrix view 203 is rendered may depend at least in part on whether the item data 156 that results from the search query 211 is in a visual category. A visual category is a category of items 155 in which a user would assess item representations 209 corresponding to the collection of items 155 in order to analyze the results of the search query 211. Examples of a visual category include, for example, clothing, shoes, decorative items, posters, furniture, cars, etc. In other embodiments, the matrix view 203 may be rendered when the item data 156 that results from the search query 211 includes text.

In FIG. 2, the matrix view 203 illustrated includes one or more configure buttons 219. Each of the configure buttons 219 corresponds to a respective one of the streams 206. A configure button 219 enables a user to edit a configuration associated with a stream 206. For example, such configurations may allow for adjusting the speed that items travel within one or more of the streams 206, pausing the movement of the progression of items in a stream 206, deleting item representation(s) 209 from a stream 206, sorting item representations 209 in a stream 206, defining a sort criteria for item representations 209 in a stream 206, and/or one or more of a variety of other configurations of the matrix view 203. In some embodiments, the configure buttons allow a user to configure the number of columns and rows in the matrix view 203 by adding a stream 206 from the matrix view 203 or deleting a stream 206 from the matrix view 203. The matrix view 203 is updated in response to one or more of the inputs regarding the configurations listed above.

In some embodiments, the streams 206 may be rearranged or reordered by moving a stream 206 within the matrix view 203. In other words, a stream 206 may be selected at first location within the matrix view 203 and then dragged and dropped at a second location within the matrix view 203. Further, in some embodiments, a stream segment 204c, 204d (FIG. 6A) may be detached from a stream 206b (FIG. 6A) and moved to form a new stream 206c, 206d (FIG. 6B).

Figure 3:
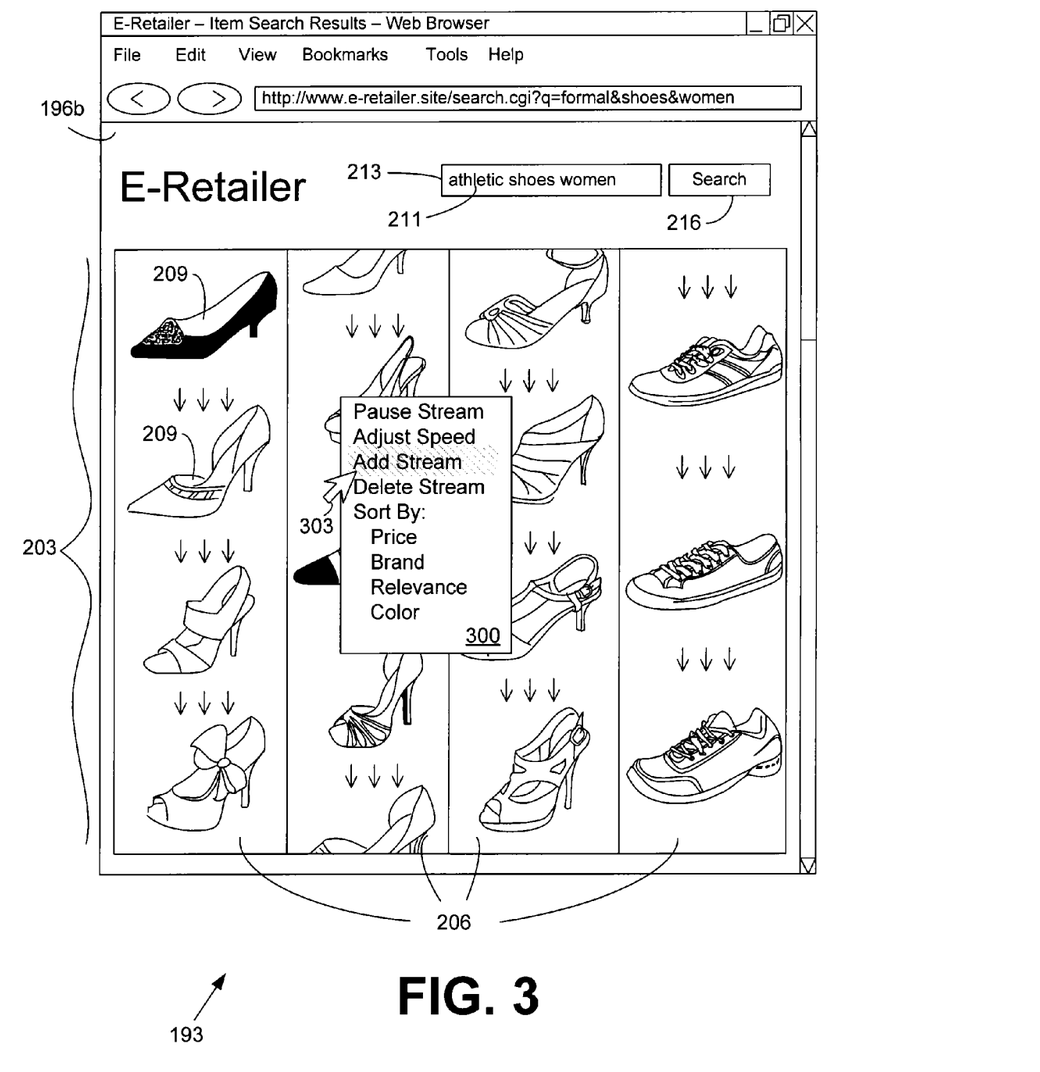

Turning now to FIG. 3, shown is a drawing of an example of a network page 196 (FIG. 1), denoted herein as 196b, that is rendered by a client 106 (FIG. 1) in the data communications network 100 (FIG. 1) according to various embodiments of the present disclosure. The network page 196b depicted in FIG. 3 includes an example of a menu 300 that may be presented responsive to a mouse click associated with a cursor 303 positioned in a stream 206. For example, a user might click on a mouse when the cursor 303 is positioned over a stream 206. In response, a menu 300 is rendered in the matrix view 203 that provides configuration options for the stream 206 or the matrix view 203 that may be selectable by another mouse click.

The matrix view 203 may be updated to include additional search results. For example, a user inputs a second search query 211 (e.g., "athletic shoes women"), and the search query 211 is sent to the electronic commerce application 133 (FIG. 1) in the computing device 103 (FIG. 1). The electronic commerce application 133 generates a second collection of items 155 (FIG. 1) (e.g., search results) as a result of a search based at least in part on the second search query 211. Item data 156 (FIG. 1) corresponding to the second collection of items 155 is sent to the browser 193 (FIG. 1) in the client 106. The item data 156 corresponding to at least a portion of the second collection of items 155 may replace the item data 156 corresponding to a least a portion of the collection of items 155 already presented in the matrix view 203. In some embodiments, the item data 156 corresponding to at least a portion of the second collection of items 155 is presented in a new stream 206 that is added to the matrix view 203.

Figure 4:
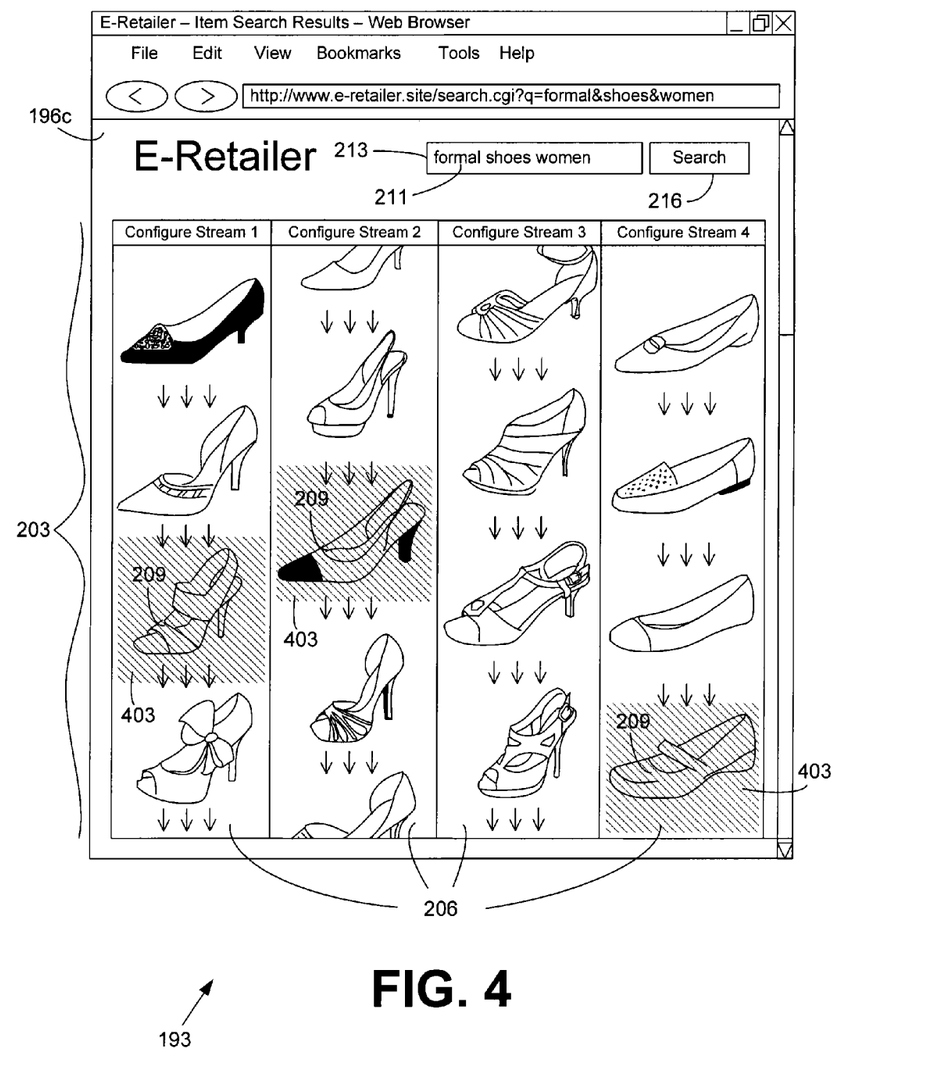

Moving now to FIG. 4, shown is a drawing of an example of a network page 196 (FIG. 1), denoted herein as 196c, that is rendered by a client 106 (FIG. 1) in the data communications network 100 (FIG. 1) according to various embodiments of the present disclosure. A network page 196c including a matrix view 203 is rendered in the browser 193 (FIG. 1) at the client 106. Several item representations 209 are selected by highlighting 403 in the matrix view 203. The item representations 209 may be selected in order to delete the corresponding items 155 (FIG. 1) from the matrix view 203 or for inclusion in a summary view.

Figure 5:
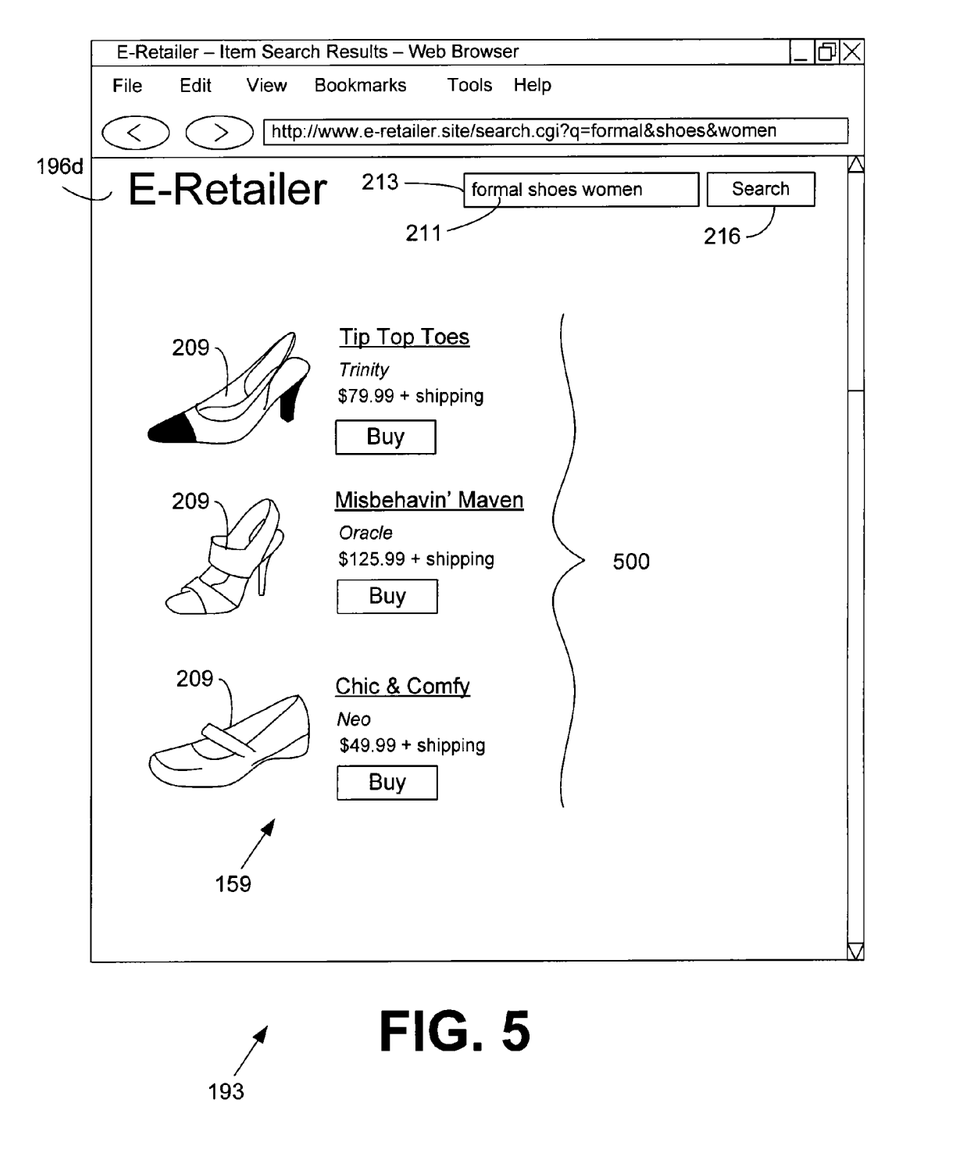

Moving now to FIG. 5, shown is a drawing of an example of a network page 196 (FIG. 1), denoted herein as 196d, that is rendered by a client 106 (FIG. 1) in the data communications network 100 (FIG. 1) according to various embodiments of the present disclosure. The network page 196d illustrated in FIG. 5 includes a nonlimiting example of a summary view 500 in the form of a list of item data 156 (FIG. 1) including the item representations 209 highlighted 403 in FIG. 4. Accordingly, a user may view a moving progression of item representations 209 and/or other item data 156, make selections, and then view a summary view 500 of the selections in order to more efficiently evaluate and narrow search results than by analyzing a list by scrolling and paging through the search results.

Figure 6A:
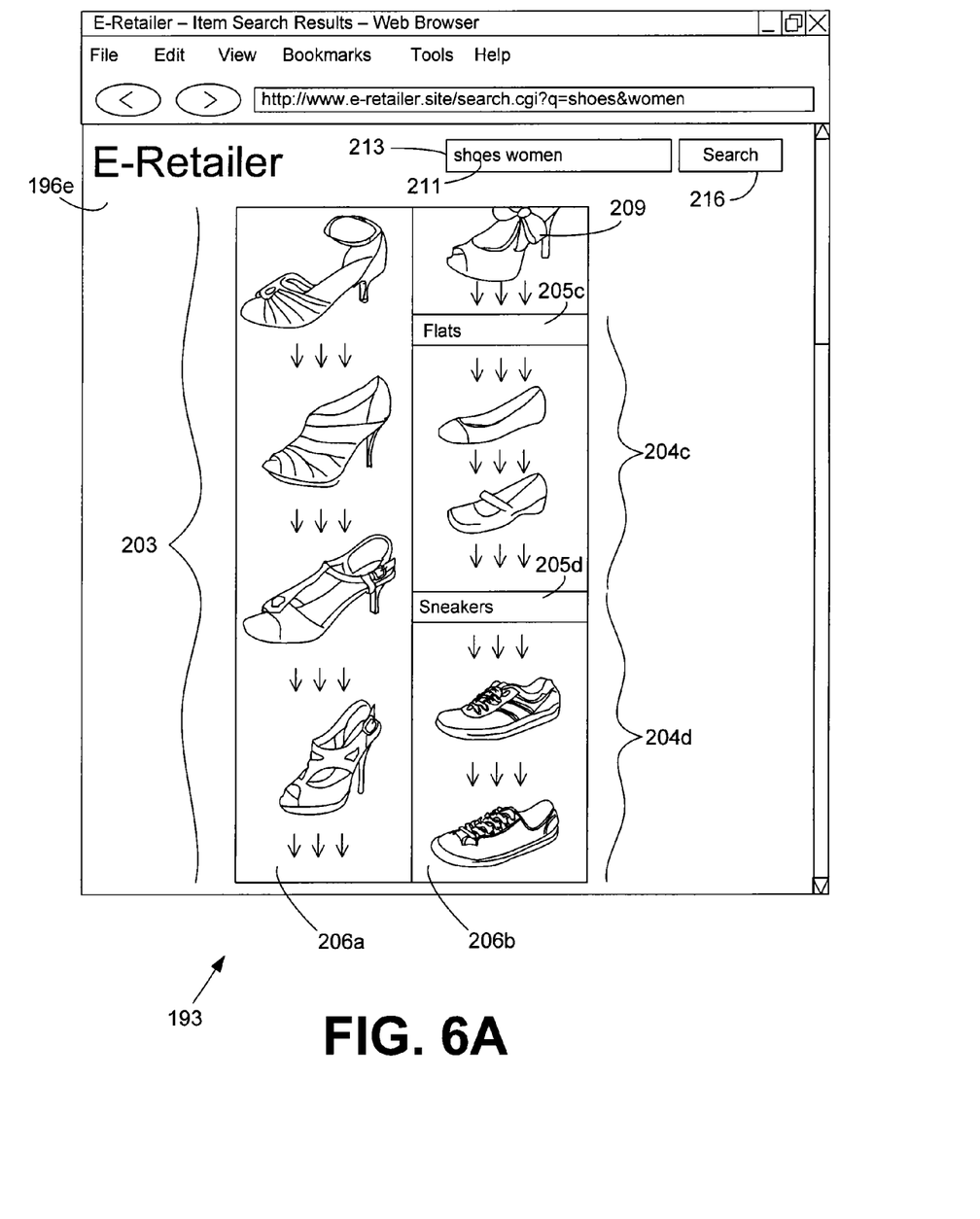
Figure 6B:
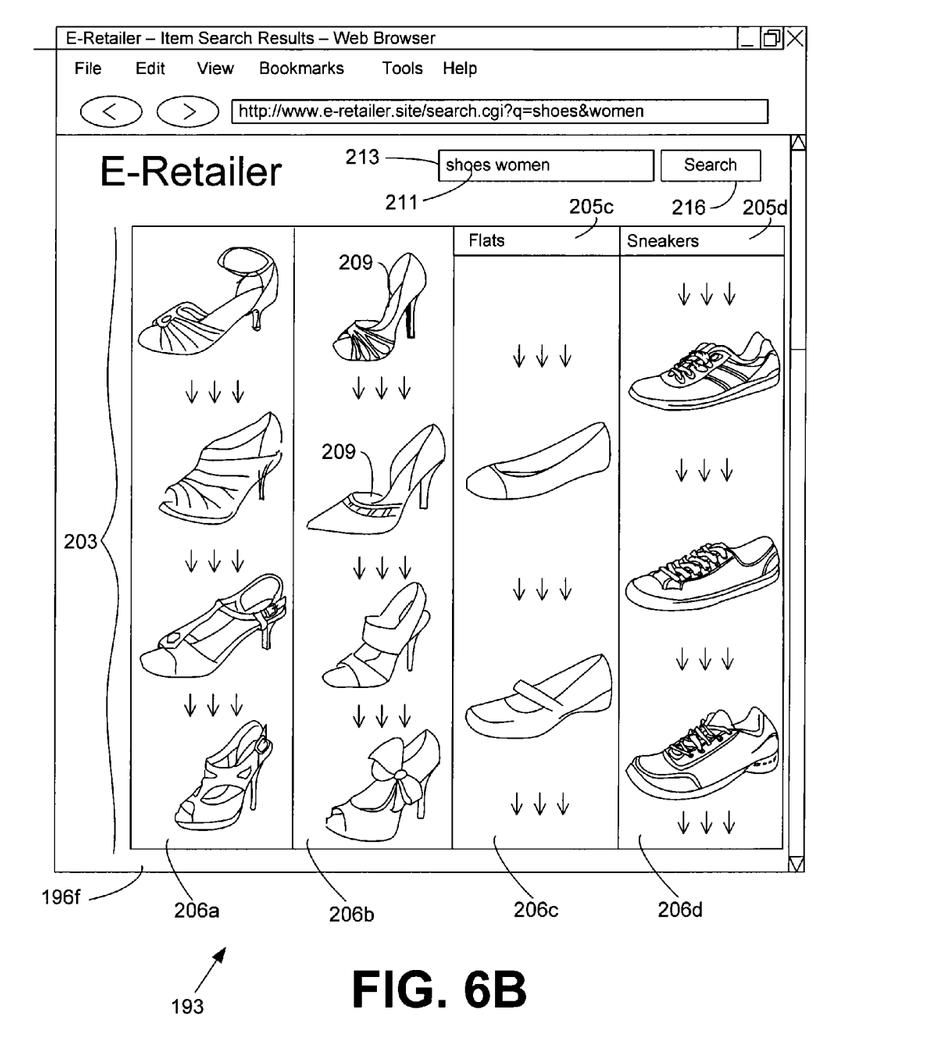

Moving now to FIG. 6A, shown is a drawing of an example of a network page 196 (FIG. 1), denoted herein as 196e, that is rendered by a client 106 (FIG. 1) in the data communications network 100 (FIG. 1) according to various embodiments of the present disclosure. The network page 196e illustrated in FIG. 6 includes a nonlimiting example of a matrix view 203 including a plurality of streams 206, denoted as 206a and 206b. Stream 206b includes a plurality of stream segments 204, denoted as 204c and 204d. A stream segment 204 is a segment of a stream 206 that includes one or more item representations 209. In some embodiments, such as the embodiment illustrated in FIG. 6A, the stream segments 204 include a heading 205, denoted as 205c and 205d (e.g., "Flats" and "Sneakers"). For example, the stream 206a may have resulted from an initial search query 211 (e.g., "formal shoes women"), and the stream 206b may have been added based on another search query 211 (e.g., "shoes women"). In this example, the stream 206b includes various stream segments 204 that represent various categories (e.g., flats, sneakers).

A stream segment 204 may be detached from a stream 206 to form an additional, different stream 206 as illustrated, for example, in FIG. 6B. FIG. 6B is a drawing of an example of a network page 196 (FIG. 1), denoted herein as 196f, that is rendered by a client 106 (FIG. 1) in the data communications network 100 (FIG. 1) according to various embodiments of the present disclosure. The network page 196f includes a matrix view 203 including a plurality of streams 206a, 206b, 206c, and 206d. The stream segments 204c, 204d are detached from stream 206b and form additional streams 206c, 206d including headings 205c, 205d. Accordingly, a stream 206c, 206d may be added to a matrix view 203 by detaching a stream segment 204c, 204d and positioning the stream segment 204c, 204d within the matrix view 203 to form a new stream 206c, 206d.

Figure 7:
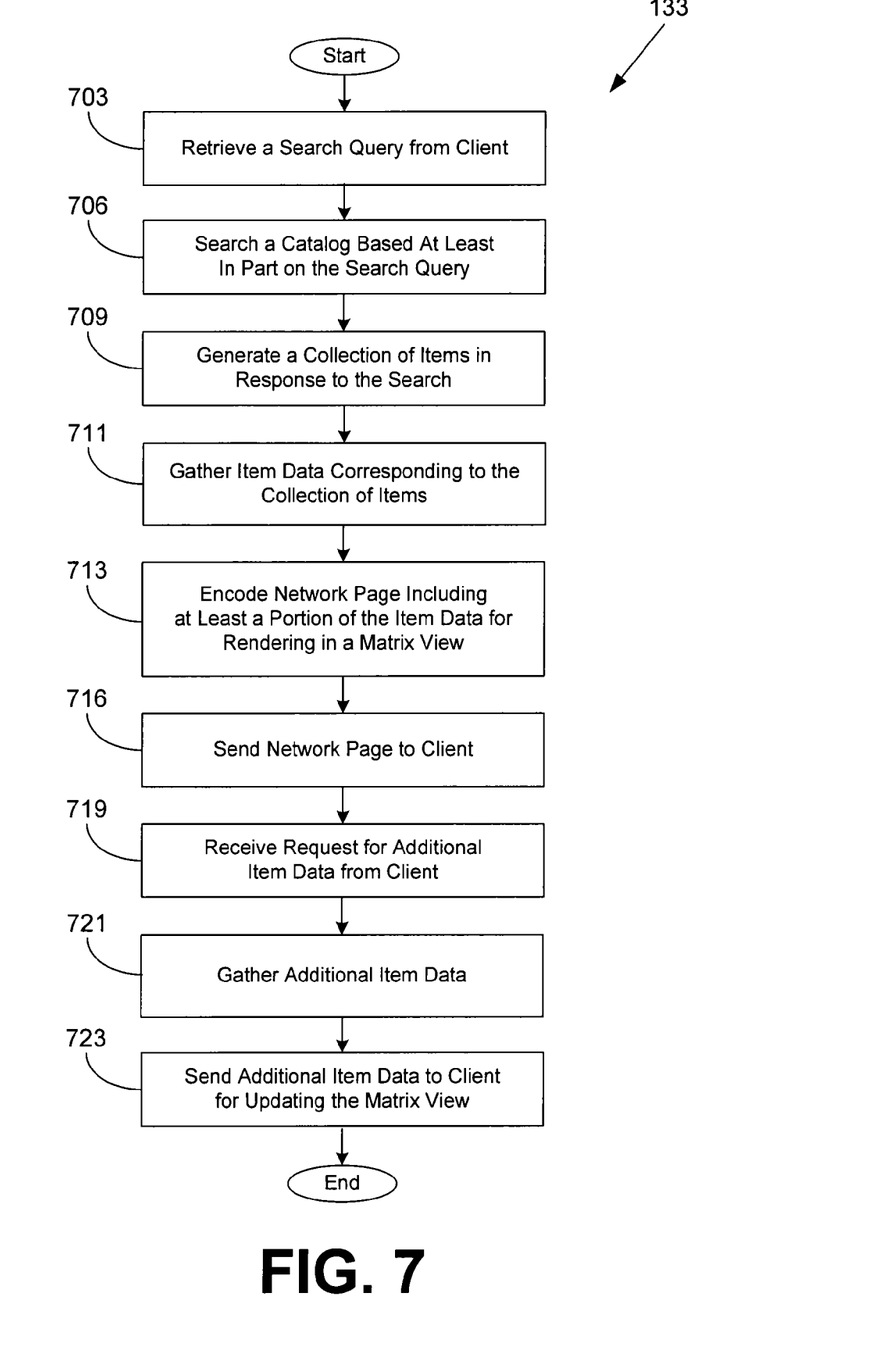
FIG. 7 is a flowchart illustrating one example of functionality implemented as portions of an electronic commerce application executed in a computing device in the data communications network of FIG. 1 according to various embodiments of the present disclosure.

Referring next to FIG. 7, shown is a flowchart that provides one example of the operation of a portion of the electronic commerce application 133 (FIG. 1) according to various embodiments. It is understood that the flowchart of FIG. 7 provides merely an example of the many different types of functional arrangements that may be employed to implement the operation of the portion of the electronic commerce application 133 as described herein. As an alternative, the flowchart of FIG. 7 may be viewed as depicting an example of steps of a method implemented in the computing device 103 (FIG. 1) according to one or more embodiments.

Beginning with box 703, a search query 211 (FIG. 2) is retrieved from a client 106 (FIG. 1) by a computing device 103 (FIG. 1). The search query 211 is related to items 155 (FIG. 1) included in a catalog 154 (FIG. 1) stored in the data store 136 (FIG. 1). The search query 211 (e.g., "formal shoes women") is provided by a user in a search field 213 (FIG. 2) in a network page 196 (FIG. 1) rendered in a browser 193 (FIG. 1).

In box 706, a catalog 154 is searched based at least in part on the search query 211 using a search application 163 (FIG. 1) in a electronic commerce application 133 (FIG. 1) executed in the computing device 103. Further, in box 709, a collection of items 155 is generated in response to the search in box 706. Next, in box 711, the computing device 103 gathers item data 156 (FIG. 1) corresponding to the collection of items 155 generated in box 709. The item data 156 includes, for example, item representations 209, item images, and/or other data related to items 155.

After gathering the item data 156, a network page 196 (FIG. 1) is encoded using a network page encoder 166 (FIG. 1) in the electronic commerce application 133 executed in the computing device 103. The network page 196 includes at least a portion of the gathered item data 156, and when rendered, the network page 196 provides a matrix view 203 (FIG. 2) of at least a portion of the gathered item data 156. The matrix view 203 includes at least two or more streams 206 (FIG. 2). At least one of the streams 206 includes a moving progression across a portion of the network page 196 of at least a portion of the item representations 209 included in the gathered item data 156. Each item datum 156 corresponds to a respective one of the items 155 in the collection of items 155. In box 716, the network page 196 is sent from the computing device 103 to the client 106 over the network 109 (FIG. 1).

In some embodiments, additional item data 156 corresponding to additional items 155 is retrieved for inclusion in an existing network page 196. For example, as illustrated in FIG. 7, the computing device 103 retrieves a request for additional item data 156 from the client 106. This request may be in the form of a second search query 211. In such a case, a second search is performed using the search application 163 that generates a second collection of items 155. Additional item data 156 corresponding to the second collection of items 155 is gathered in box 721. The additional item data 156 is sent to the client 106 for updating the matrix view 203.

Figure 8:
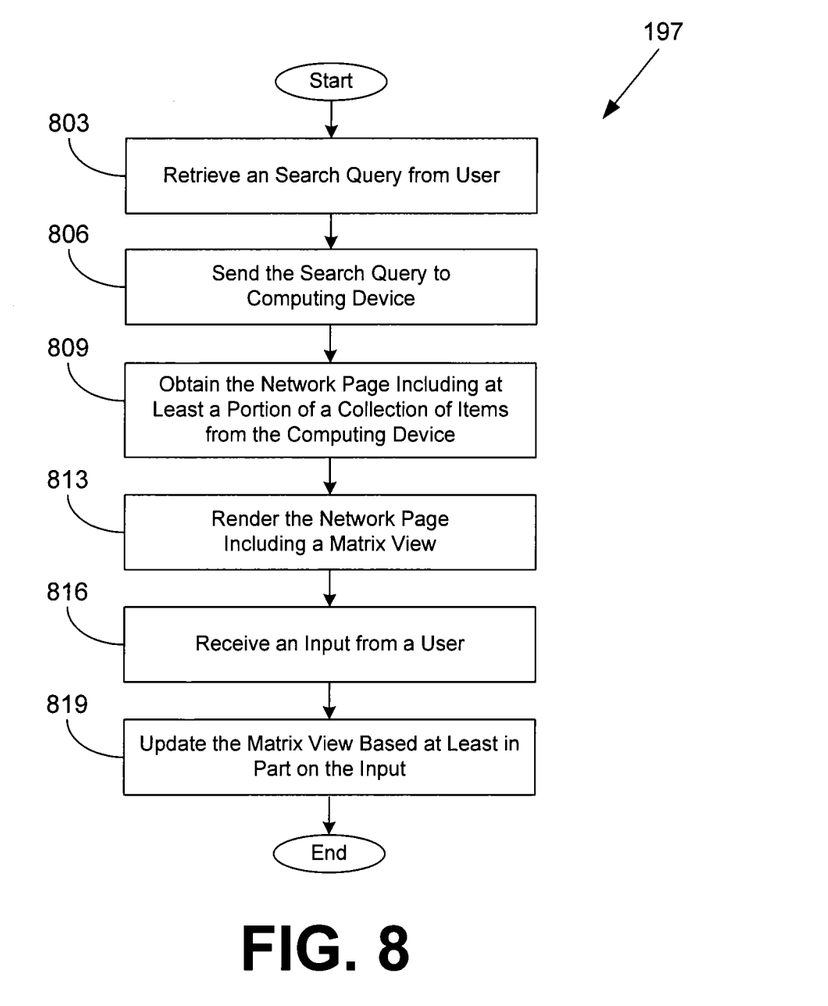
FIG. 8 is a flowchart illustrating one example of functionality implemented as portions of a matrix view executable that is executed in a client in the data communications network of FIG. 1 according to various embodiments of the present disclosure.

Turning now to FIG. 8, shown is a flowchart that provides one example of the operation of a portion of the matrix view executable 197 (FIG. 1) according to various embodiments. It is understood that the flowchart of FIG. 8 provides merely an example of the many different types of functional arrangements that may be employed to implement the operation of the portion of the matrix view executable 197 as described herein. As an alternative, the flowchart of FIG. 8 may be viewed as depicting an example of steps of a method implemented in the client 106 (FIG. 1) according to one or more embodiments.

Beginning with box 803, a search query 211 (FIG. 2) (e.g., "formal shoes women") is retrieved from a user using a client 106. The search query 211 is provided by a user in a search field 213 (FIG. 2) rendered in a network page 196 (FIG. 1) in a browser 193 (FIG. 1). The search query 211 is related to items 155 (FIG. 1) and corresponding to item data 156 (FIG. 1) included in a catalog 154 (FIG. 1) stored in the data store 136 (FIG. 1) in the computing device 103 (FIG. 1).

In box 806, the search query 211 is sent to the computing device 103 from the client 106 over the network 109 (FIG. 1). A network page 196 is obtained from the computing device 103 in box 809. The network page 196 includes item data 156 corresponding to at least a portion of a collection of items 155 generated by the computing device 103 in response to a search based on the search query 211 sent to the computing device 103. The item data 156 includes, for example, item representations 209 (FIG. 2), item images, and/or other data related to items 155.

In box 813, the network page 196 that was retrieved from the computing device 103 is rendered in a browser 193. When rendered, the network page 196 provides a matrix view 203 (FIG. 2) of at least a portion of the item data 156. The matrix view 203 includes at least two or more streams 206 (FIG. 2). At least one of the streams 206 includes a moving progression across a portion of the network page 196 of at least a portion of item representations 209 included in the gathered item data 156. Each item representations 209 corresponds to a respective one of the items 155 in the collection of items 155.

In box 816, an input is received in the client 106 from a user. The input is related to a configuration change or update initiated by a user. The configuration change or update may be related to a stream 206 or the matrix view 203. For example, the configuration change or update may be an adjustment of a speed of one or more of the streams 206 in the matrix view 203. Another example of a configuration change or update includes an addition or deletion of one or more streams 206. The additional stream 206 may include a moving progression of additional item representations 209 associated with another search query 211 across the network page 196.

Other examples of a configuration change or update include a pause of a movement of item data 156 in a stream 206, a deletion of item data 156 from the matrix view 203, a sorting of the item data 156 in a stream 206, a creation or change of a definition of sort criteria for a stream 206, a change of the number of columns and/or rows in a matrix view 203, and/or a highlight 403 (FIG. 4) of and item representation 209 item data 156 in a stream 206. In some embodiments, the matrix view 203 provides a menu 300 (FIG. 3) to facilitate configuring, changing, and/or updating a stream 206 or the matrix view 203. In some embodiments, streams 206 are sorted according to different criteria.

In some embodiments, the configuration change or update is a selection of at least a portion of the item data 156 in the matrix view 203. The selected item data 156 is then aggregated and presented in a summary view 500 (FIG. 5). In box 819, the matrix view 203 is updated based at least in part on the input received in box 816.

Figure 9:
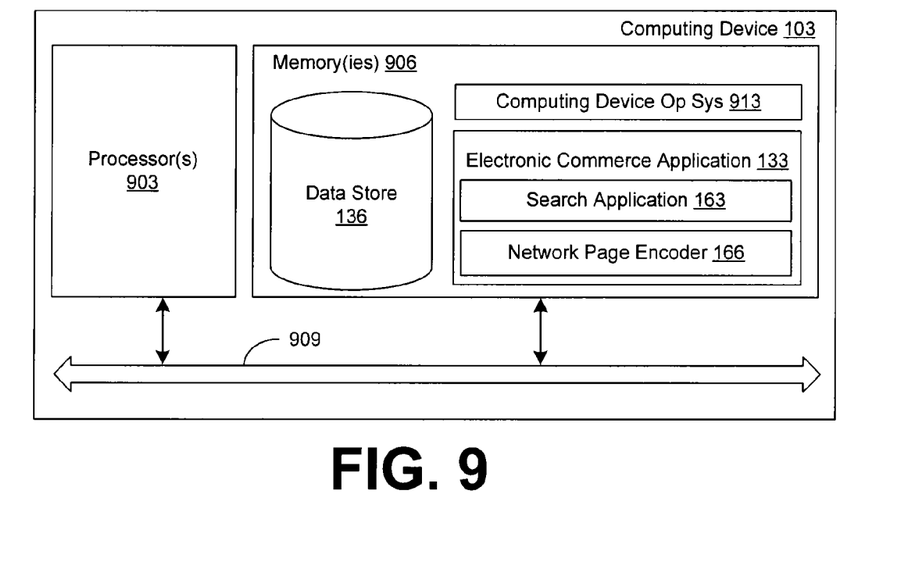
FIG. 9 is a schematic block diagram that provides one example illustration of a computing device employed in the data communications network of FIG. 1 according to various embodiments of the present disclosure.

With reference to FIG. 9, shown is a schematic block diagram of the computing device 103 according to an embodiment of the present disclosure. The computing device 103 includes at least one processor circuit, for example, having a processor 903 and a memory 906, both of which are coupled to a local interface 909. To this end, the computing device 103 may comprise, for example, at least one server computer or like device. The local interface 909 may comprise, for example, a data bus with an accompanying address/control bus or other bus structure as can be appreciated.

Stored in the memory 906 are both data and several components that are executable by the processor 903. In particular, stored in the memory 906 and executable by the processor 903 is an electronic commerce application 133, and potentially other applications. The electronic commerce application 133 includes a search application 163 and a network page encoder 166. Also stored in the memory 906 may be a data store 136 and other data. In addition, an operating system 913 may be stored in the memory 906 and executable by the processor 903.

Figure 10:
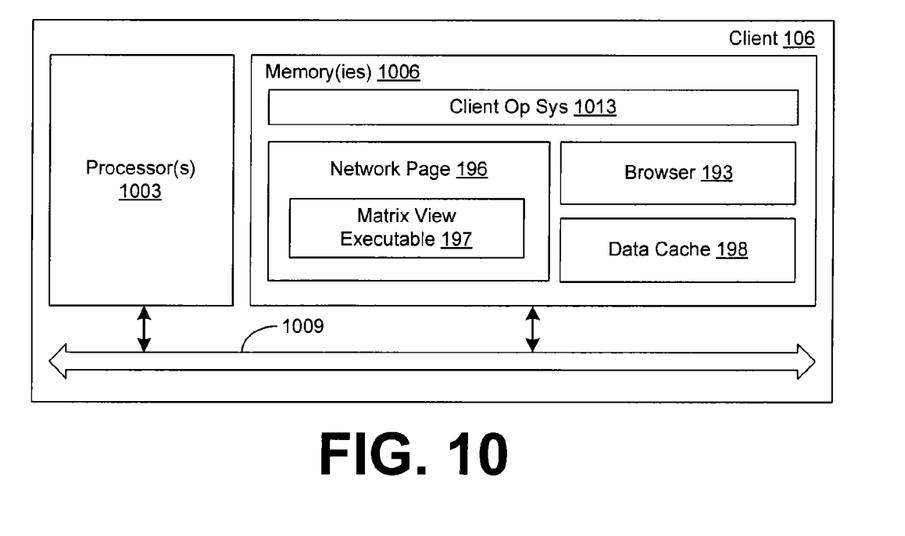
FIG. 10 is a schematic block diagram that provides one example illustration of a client employed in the data communications network of FIG. 1 according to various embodiments of the present disclosure.

Similarly, with reference to FIG. 10, shown is a schematic block diagram of the client 106 according to an embodiment of the present disclosure. The client 106 includes at least one processor circuit, for example, having a processor 1003 and a memory 1006, both of which are coupled to a local interface 1009. To this end, the client 106 may comprise, for example, a desktop computer, a laptop computer, a personal digital assistant, a cellular telephone, set-top box, music players, web pads, tablet computer systems, or other devices with like capability. The local interface 1009 may comprise, for example, a data bus with an accompanying address/control or other bus structure as can be appreciated.

Stored in the memory 1006 are several components that are executable by the processor 1003. In particular, stored in the memory 1006 is a data cache 198 and executable by the processor 1003 is a browser 193, and potentially other applications. In addition, an operating system 1013 may be stored in the memory 1006 and executable by the processor 1003.

Referring to FIGS. 9 and 10, it is understood that there may be other applications that are stored in the memory 906, 1006 and are executable by the processors 903, 1003 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 906, 1006 and are executable by the processor 903, 1003. In this respect, the term "executable" means a program file that is in a form that can ultimately be run by the processor 903, 1003. Examples of executable programs may be, for example, a compiled program that can be translated into machine code in a format that can be loaded into a random access portion of the memory 906, 1006 and run by the processor 903, 1003 source code that may be expressed in proper format such as object code that is capable of being loaded into a random access portion of the memory 906, 1006 and executed by the processor 903, 1003, or source code that may be interpreted by another executable program to generate instructions in a random access portion of the memory 906, 1006 to be executed by the processor 903, 1003, etc. An executable program may be stored in any portion or component of the memory 906, 1006 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 906, 1006 is defined herein as including both volatile and nonvolatile memory and data storage components. Volatile components are those that do not retain data values upon loss of power. Nonvolatile components are those that retain data upon a loss of power. Thus, the memory 906, 1006 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 903, 1003 may represent multiple processors 903, 1003 and the memory 906, 1006 may represent multiple memories 906, 1006 that operate in parallel processing circuits, respectively. In such a case, the local interface 909, 1009 may be an appropriate network 109 (FIG. 1) that facilitates communication between any two of the multiple processors 903, 1003, between any processor 903, 1003 and any of the memories 906, 1006, or between any two of the memories 906, 1006, etc. The local interface 909, 1009 may comprise additional systems designed to coordinate this communication, including, for example, performing load balancing. The processor 903, 1003 may be of electrical or of some other available construction.

Although the electronic commerce application 133, the matrix view executable 197, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 7 and 8 show the functionality and operation of an implementation of portions of the electronic commerce application 133 and the matrix view executable 197. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 903, 1003 in a computer system or other system. The machine code may be converted from the source code, etc. If embodied in hardware, each block may represent a circuit or a number of interconnected circuits to implement the specified logical function(s).

Although the flowcharts of FIGS. 7 and 8 show a specific order of execution, it is understood that the order of execution may differ from that which is depicted. For example, the order of execution of two or more blocks may be scrambled relative to the order shown. Also, two or more blocks shown in succession in FIGS. 7 and 8 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce application 133 and the matrix view executable 197, that comprises software or code can be embodied in a non-transitory form in any computer-readable medium for use by or in connection with an instruction execution system such as, for example, a processor 903, 1003 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer-readable medium embodying a program executable in a computing device, the program comprising:
   code that retrieves a search query from a user;
   code that retrieves a display request from the user;
   code that sends the search query to a computing resource in communication with a client computing device;
   code that retrieves a network page from the computing resource including item data corresponding to a collection of items, the item data gathered based at least in part on the search query; and
   code that renders the network page, the network page providing a matrix view of at least a portion of the item data, the matrix view including a plurality of streams of item data, wherein at least one of the plurality of streams is a moving progression of item images across the network page, individual ones of the item images corresponding to a respective one of the collection of items, wherein the matrix view is configured to adjust a traveling speed of a user-selected one of the plurality of streams, wherein the at least one of the plurality of streams is rendered in a cyclical progression in response to the display request, wherein a stream segment of a first stream of the plurality of streams is capable of being detached from the first stream by the user to form a second stream.

2. The non-transitory computer-readable medium of claim 1, wherein individual ones of the plurality of streams includes a plurality of item images, and a respective item image corresponds to an item in at least a portion of the collection of items.

3. A system, comprising:
   at least one processor coupled to a memory; and
   an application executable in the at least one processor, the application comprising:
      logic that searches and gathers a plurality of item representations based at least in part on a search query retrieved from a client computing device; and
      logic that encodes a network page for rendering by the client computing device, the network page providing a matrix view of at least a portion of the plurality of item representations, the matrix view including a plurality of streams, wherein a first stream of the plurality of streams is a first moving progression of item representations across at least a first portion of the network page, wherein the first stream comprises a plurality of stream segments, wherein at least one of the plurality of stream segments is capable of being detached from the first stream to form a second stream comprising a second moving progression of item representations across at least a second portion of the network page, wherein the matrix view is configured to adjust a traveling speed of a user-selected one of the plurality of streams.

4. The system of claim 3, wherein at least one of the plurality of item representations includes an item image.

5. The system of claim 3, wherein the application further comprises:
   logic that retrieves a request for additional item data from the client computing device;
   logic that gathers the additional item data; and
   logic that sends the additional item data to the client computing device.

6. A method, comprising:
   determining, in a computing resource, whether to render a matrix view of at least a portion of a collection of items based at least in part upon whether the at least a portion of the collection of items is in a visual category;
   encoding, in the computing resource, a network page for rendering by a client computing device that is in communication with the computing resource in response to determining to render the matrix view, the network page providing the matrix view of the at least a portion of the collection of items, the matrix view including a plurality of streams, wherein at least one of the plurality of streams is a moving progression of item images across the network page, individual ones of the item images corresponding to at least one of the collection of items, wherein the matrix view is configured to adjust a traveling speed of a user-selected one of the plurality of streams, wherein a first stream segment of a first stream of the plurality of streams is capable of being detached from the first stream by a user to form a second stream; and
   sending the network page to the client computing device.

7. The method of claim 6, further comprising:
   searching a catalog of items based at least in part on a search query retrieved from the client computing device;
   generating the collection of items based at least in part on the searching of the catalog of items; and
   gathering item data corresponding to the collection of items.

8. The method of claim 6, further comprising:
   retrieving a request for additional item data from the client computing device; and
   sending the additional item data to the client computing device for updating the matrix view of the network page.

9. The method of claim 6, wherein the plurality of streams are sorted based at least in part on a sort criterion.

10. A method, comprising:
storing a network page in a memory in a client computing device;
defining a sort criterion, in the client computing device, for a plurality of item representations associated with at least a portion of a collection of items in response to a user submitted criterion, wherein individual ones of the plurality of item representations correspond to at least one of the collection of items; and
rendering, in the client computing device, the network page providing a matrix view of the at least a portion of the collection of items, the matrix view including a plurality of streams, wherein at least one of the plurality of streams is a moving progression of item representations across at least a portion of the network page, wherein the matrix view is configured to adjust a traveling speed of a user-selected one of the plurality of streams, wherein a first stream segment of a first stream of the plurality of streams is detachable from the first stream by a user to form a second stream.

11. The method of claim 10, further comprising:
retrieving a search query from the user;
sending the search query to a computing resource in communication with the client computing device; and
obtaining the network page from the computing resource.

12. The method of claim 10, further comprising retrieving item data corresponding to additional items for inclusion in an existing network page.

13. The method of claim 10, further comprising adding a stream or deleting a stream from the matrix view in response to an input.

14. The method of claim 10, further comprising rearranging the plurality of streams by moving a stream within the matrix view.

15. The method of claim 10, further comprising pausing a movement of an item representation in response to an input.

16. The method of claim 10, further comprising deleting an item representation from a stream in response to an input.

17. The method of claim 10, wherein the plurality of streams are rendered in a vertical orientation across the network page.

18. The method of claim 10, further comprising configuring a number of columns and rows in the matrix view in response to an input.

19. The method of claim 10, further comprising highlighting an item representation in response to an input.

20. The method of claim 10, further comprising updating the matrix view based at least in part on a matrix view modification input provided by the user.

21. The method of claim 10, wherein the matrix view provides a menu for configuring the matrix view.

22. A system, comprising:
at least one processor coupled to a memory; and
a matrix view application executable in the at least one processor, the matrix view application comprising:
logic that identifies a collection of items in response to a search query;
logic that renders a network page providing a matrix view of at least a portion of the collection of items, the matrix view including a plurality of streams, wherein at least one of the plurality of streams is a moving progression of item images across at least a portion of the network page, individual ones of the item images corresponding to at least one of the collection of items;
logic that renders a menu superimposed upon the at least one of the plurality of streams in response to a user interaction;
logic that adjusts a traveling speed of a user-selected one of the plurality of streams in response to a user selection of a component rendered in the menu; and
logic that facilitates detachment of a first stream segment of a first stream of the plurality of streams from the first stream by a user to form a second stream.

23. The system of claim 22, wherein the plurality of streams are sorted according to different criteria.

24. The system of claim 22, wherein one of the plurality of streams also includes item data corresponding to at least a portion of the collection of items, and the one of the plurality of streams also includes additional item data.

25. The system of claim 22, wherein at least one of the plurality of streams is responsive to a mouse movement.

26. The system of claim 22, wherein one of the plurality of streams also includes item data corresponding to a user list.

27. The system of claim 22, wherein the matrix view application further comprises:
logic that receives a plurality of item selections in the matrix view; and
logic that aggregates item data corresponding to the plurality of item selections in a summary view.

* * * * *